F. PARRY.
TROUGH FOR FISH HATCHERIES.
APPLICATION FILED DEC. 5, 1910.
1,007,383.
Patented Oct. 31, 1911.
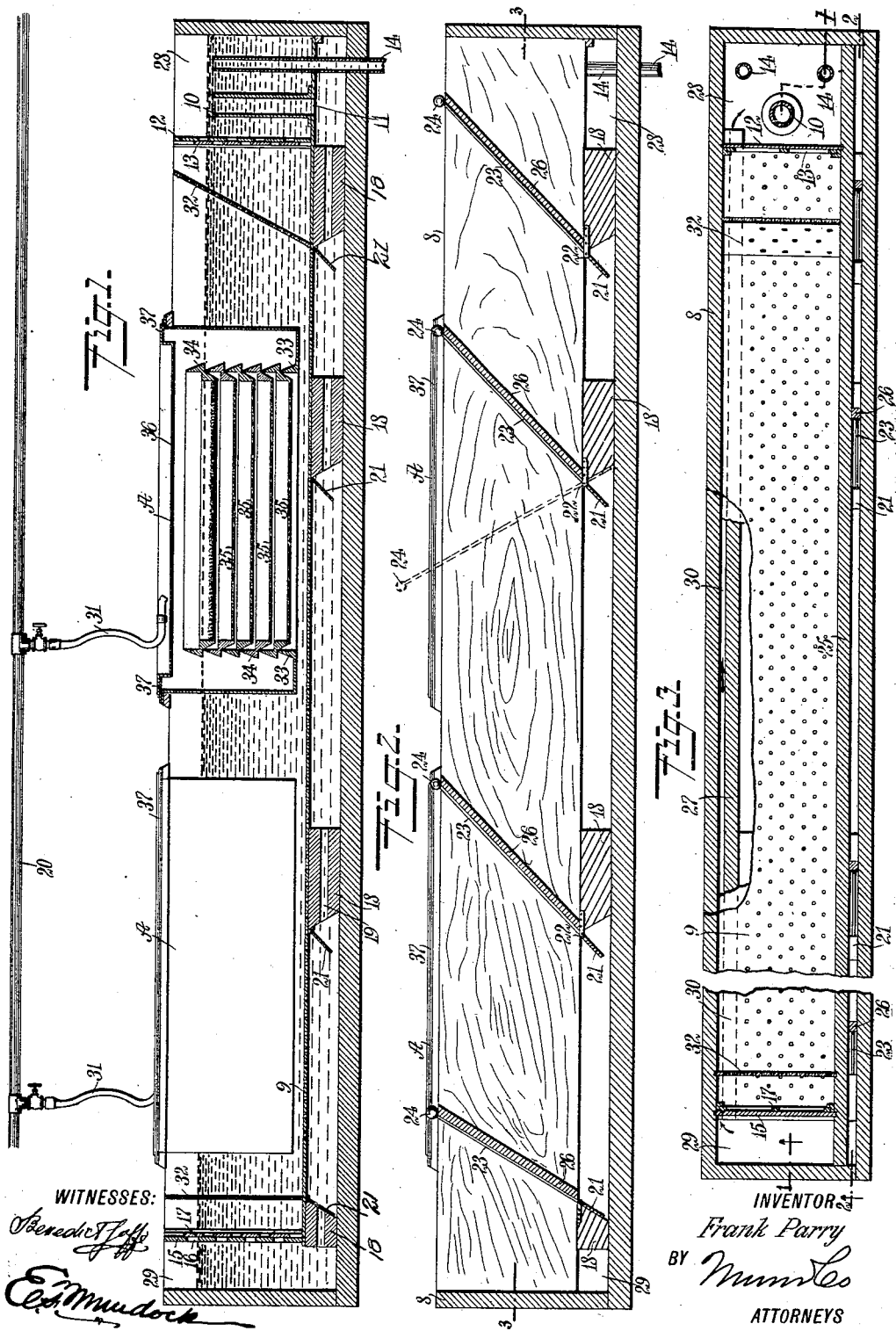
WITNESSES:
INVENTOR
Frank Parry
BY
ATTORNEYS

UNITED STATES PATENT OFFICE.

FRANK PARRY, OF BRIGHTWATER, BRITISH COLUMBIA, CANADA.

TROUGH FOR FISH-HATCHERIES.

1,007,383.  Specification of Letters Patent.  Patented Oct. 31, 1911.

Application filed December 5, 1910. Serial No. 595,641.

*To all whom it may concern:*

Be it known that I, FRANK PARRY, a subject of the King of Great Britain, and a resident of Brightwater, in the Province of British Columbia and Dominion of Canada, have invented a new and Improved Trough for Fish-Hatcheries, of which the following is a full, clear, and exact description.

Among the principal objects which the present invention has in view are: to provide means for subjecting the "fry" while in the trough to the action of flowing water, while preventing the same from passing through the trough; to provide means for causing the water in the incubation trough to flow upward therefrom to lift the "fry;" and to provide means for mechanically altering the direction of the current flow in said trough.

One embodiment of the present invention is disclosed in the structure illustrated in the accompanying drawings, in which like characters of reference denote corresponding parts in all the views, and in which—

Figure 1 is a vertical section taken on the line 1—1 in Fig. 3, of a hatchery trough constructed and arranged in accordance with the present invention; Fig. 2 is a vertical section taken on the line 2—2 in Fig. 3, of a trough constructed and arranged in accordance with the present invention; and Fig. 3 is a longitudinal horizontal view taken on the line 3—3 in Fig. 2.

The present invention is complementary to and relates to an application for patent filed by me the second day of May, 1910, bearing the Serial Number 559,031, for improvements in a process and apparatus for the propagation of fish, to which application cross reference is here made.

The hatchery is usually provided with a series of troughs 8, 8, which are elongated and adapted to receive a series of baskets of the character and construction set forth in the companion application above referred to. These baskets, as shown in the accompanying drawings, are indicated by the letter A. The rims of the said baskets are so formed as to rest on the upper edge of the vertical sides of the said troughs. In this manner the bottoms of the baskets are prevented from touching the screens 9, 9 with which the troughs are provided. At the lower end of each trough there is provided an upright circulation pipe 10. The pipe 10 is open at both ends, and is extended above a perforation 11 formed in the screen bottom 9. At the end of the trough is a partition 12. The partition 12 has horizontally disposed openings which are covered with a cage or slatted shutter 13. When the shutter 13 is suitably disposed the circulation of water throughout the length of each of the said troughs is uninterrupted, and may pass direct to an overflow pipe 14, which is connected with a waste of any suitable character. Whenever the shutter 13 is closed it is then that the water, in passing out of a trough, is compelled to pass upward through the circulation pipe 10.

At the end opposite that having the circulation pipe 10 and the overflow pipe 14 there is provided a fixed partition 15. The partition 15 is provided with horizontal openings 16 which are adapted to be closed by a slatted shutter 17 resembling in construction the shutter 13 at the opposite end of the said trough. The bottom 9 upon which the said partitions 12 and 15 are supported, is in turn supported upon a series of blocks or partitions 18, 18. The partitions 18 are perforated to form channels 19 through which the water received from the supply pipe 20 may pass along the bottom of the trough uninterrupted. The partitions 18 are provided with gates 21, 21, which gates are hingedly mounted at 22, 22 and are provided with rod handles 23, the upper ends whereof are weighted balls 24. The handles 23 are extended between the outer walls of the troughs and the inner walls 25 thereof. Extended from each of the partitions 18 upward between the outer wall and the inner wall 25 are partitions 26, 26. The partitions 26 are disposed substantially as shown in Fig. 2 of the drawings, and are arranged to prevent the flow of water between the said inner wall 25 and the outer wall of the trough.

When in operation of the trough it becomes desirable to cause the water to flow upward through the screen bottom 9 in any of the sections of the said trough, this is accomplished by throwing the handle 23 and ball 24 thereon to the position shown in dotted lines in Fig. 2. This arrangement closes the gate 21 over the channel 19 in the said section of the trough, causing the water flowing into the said section from the preceding section to pass up over the partition 18, which is thus closed. To do this the water is gently but positively lifted upward from the bottom 9. This operation prevents the accumulation of sediment, and also prevents the smothering of the "fry" incident to the massing thereof.

On the side of the trough opposite that provided with the inner wall 25, and below the bottom 9 of the said trough, is formed lengthwise of the said trough a low partition 27. The partition 27, together with the bottom 9 and the bottom of the trough structure, forms an open channel 30 connecting the chambers 28 and 29 which are formed at the ends of the trough by the partitions 12 and 17 respectively. The chamber 28 is that wherein is disposed the circulation pipe 10 and the overflow pipe 14.

The operation of the channel 30 formed by the partition 27 is to reverse the flow of water in the trough. Under normal conditions, when the shuttles 13 and 17 are raised, the flow of the water is toward the overflow pipes 14, 14 and throughout the trough in that direction. When, however, the shutter 13 is closed and the shutter 17 is open, and the gates 21, 21 are closed, the exit of the water from the main body of the trough is compelled to be through the channel 30, the water entering from the body of the trough into the chamber 28. This results in a current of the water in the body of the trough toward the chamber 29, the reverse of the flow of current normally established in the body of the said trough. The water supply of the said trough is normally delivered from the supply pipe 20 through flexible pipes 31, 31, which, in accordance with a system of propagation invented by me, is introduced upon pans disposed above the hatchery baskets A, A, when the same are suspended in the said trough. At each end of the trough, interposed between the main body of the trough and the partitions 12 and 15 are vertically disposed screens 32, 32. The screens 32, 32 are preferably constructed of material similar to the bottom 9, the perforations in both being sufficiently small to prevent the passage through the interstices thereof of the fish ova or "fry".

It will be seen that, by manipulating the gates 21, 21 and the shutters 13 and 17, the water in the troughs, when constructed in accordance with the present invention, may be caused to flow upward through the bottom 9 or downward therethrough, as desired, and also that the current of the water may be changed to flow from one end to the other end of the trough as and when desired.

Each of the baskets A is provided with an open bottom, the edges 33 of the openings whereof are upturned and converged at the top to receive the frame or sides of an egg tray 34. The egg trays 34 are provided with frames or sides having double wedge-like extensions in cross section. Each of the upper extensions is converged to fit in the junction of the upper and lower sections of the superposed tray. In this manner the trays are each provided of the same dimensions and held in the nested position substantially as shown in Fig. 1 of the drawings. It will be observed that the edges of each lower tray in supporting an upper tray covers as little area as possible, thereby avoiding the destruction of small fish or "fry" which otherwise might rest between the said trays if a ledge was provided.

The trays 34, 34 are provided with perforated bottoms 35, 35 adapted to receive in supported relation thereon the eggs which are deposited, as shown, in the upper tray, in said Fig. 1. Superposed upon the open top of the basket A is a tray 36, having supporting margins 37 which rest upon the upper rim of the basket, substantially as shown in said Fig. 1.

At the hatching period the shells can be removed without the use of a feather, which is a slow and tedious method and a source of loss through rupture of the yoke-sac, by the upward flow of water through the perforated bottom, which lifts the shells clear of the fish. They are then carried by the current in the body of the trough through the screen-gate at either end of the trough.

Having thus described my invention, what I claim as new and desire to secure by Letters Patent is:—

1. A trough for fish hatcheries, comprising an elongated box-like structure having a water holding bottom; a perforated bottom suspended above the bottom of said box-like structure to form an elongated space therebetween, the perforations in said perforated bottom being sufficiently small to prevent the passage of fish ova or "fry"; and a plurality of gates pivotally mounted at intervals in the said space between the said bottoms, said gates being adapted to divert the water flowing through said space upward through said perforated bottom.

2. A trough for fish hatcheries, comprising an elongated box-like structure having a water holding bottom; a perforated bottom suspended above the water holding bottom to form a passage therebetween; a plurality of gates pivotally mounted at intervals in the space between said bottoms to divert the water flowing therebetween upward through said perforated bottom; and means extending from said trough for operating said gates.

3. A trough for fish hatcheries, comprising an elongated box-like trough having a water holding bottom; a perforated bottom suspended above said water holding bottom to form a space therebetween; a plurality of gates pivotally mounted at intervals in the said space, said gates being adapted to divert the water flowing therethrough upward from said perforated bottom; and a plurality of partitions arranged to form vertical channels disposed at the sides of said trough and opening into said trough below the said perforated bottom and between said gates.

4. A trough for fish hatcheries, comprising an elongated box-like structure having a water holding bottom; a perforated bottom suspended above the water holding bottom to form a space therebetween; a plurality of gates pivotally mounted at intervals in the space below said perforated bottom, adapted to divert the water flowing therethrough upward through said perforated bottom; vertical perforated partitions disposed near the ends of said box-like structure to form end compartments therein, the perforations of said bottom being adapted to prevent the passage of fish ova or "fry"; and overflow devices mounted in one of said compartments for determining the depth of water in said box-like structure.

5. A trough for fish hatcheries comprising an elongated box-like structure having a water holding bottom; a perforated bottom suspended above the water holding bottom to form a space therebetween; a plurality of gates pivotally mounted at intervals in the space below said perforated bottom adapted to divert the water flowing therethrough upward through said perforated bottom; vertical partitions disposed near the ends of said box-like structure to form end compartments; perforated screens disposed in said trough near the ends thereof, adapted to prevent the passage of fish "fry" therethrough; overflow devices mounted in one of said end compartments for determining the depth of water in said box-like structure; and closure shutters mounted on said partitions to prevent the longitudinal flow of the water through said partitions.

6. A trough for fish hatcheries, comprising an elongated box-like structure having a water holding bottom; a perforated bottom suspended above the water holding bottom to form a passage therebetween; a plurality of gates pivotally mounted at intervals in the passage between the said bottoms to divert the water flowing therethrough upward from said perforated bottom; a plurality of partitions disposed near the ends of said box-like structure to form end compartments therein; gates for opening and closing said partitions to permit the flow of water therethrough; and an open ended conduit connecting the said end compartments.

In testimony whereof I have signed this specification in the presence of two subscribing witnesses.

FRANK PARRY.

Witnesses:
WILLIAM JAMES SIM,
JOHN KIRKPATRICK.

---

Copies of this patent may be obtained for five cents each, by addressing the "Commissioner of Patents, Washington, D. C."